Dec. 27, 1966  S. GOLDSTEIN  3,294,400
DANCING APPARATUS
Filed March 21, 1966  6 Sheets-Sheet 1
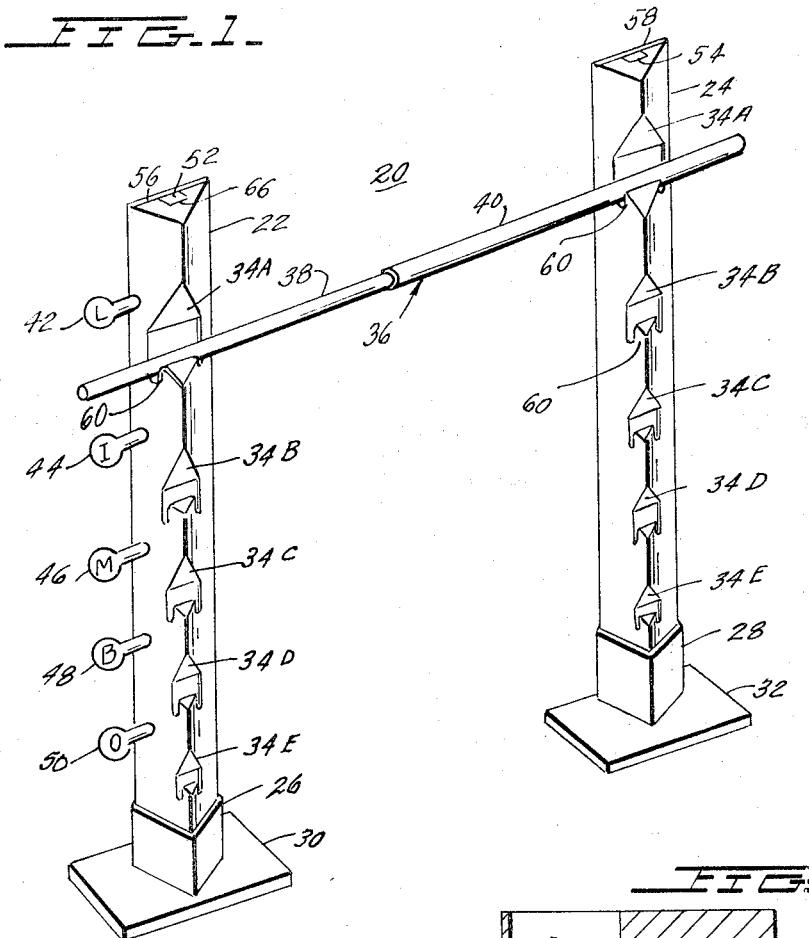
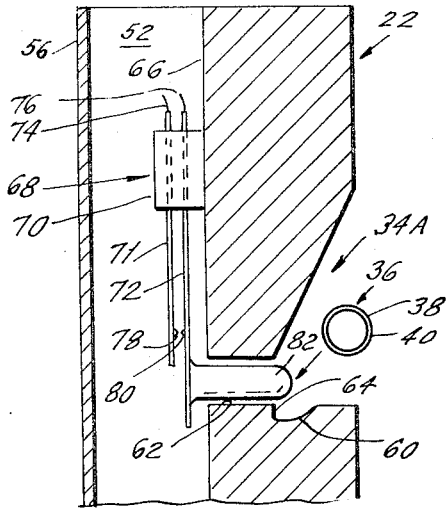
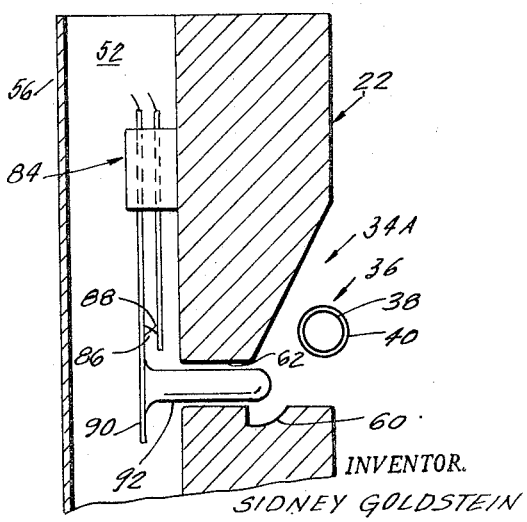
INVENTOR.
SIDNEY GOLDSTEIN
BY
OSTROLENK, FABER, GERB & SOFFEN
ATTORNEYS

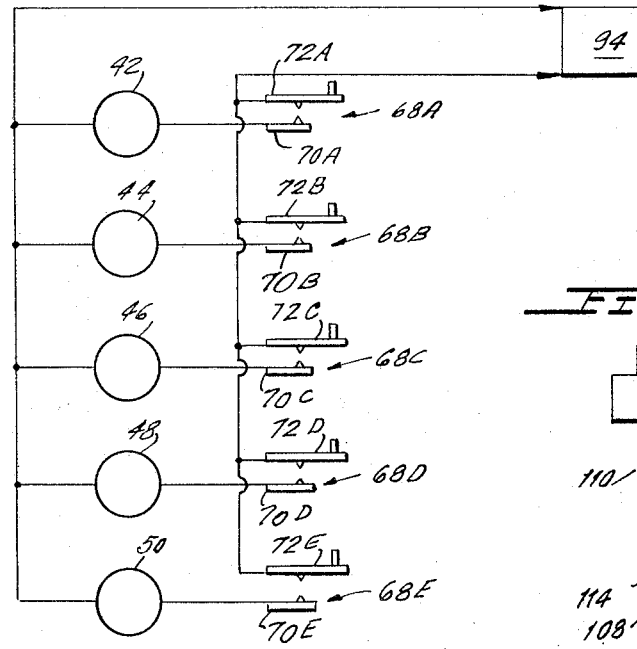
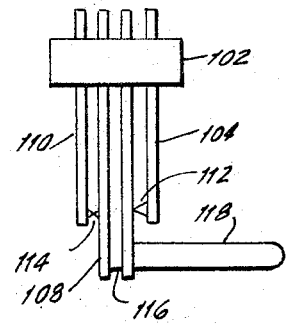
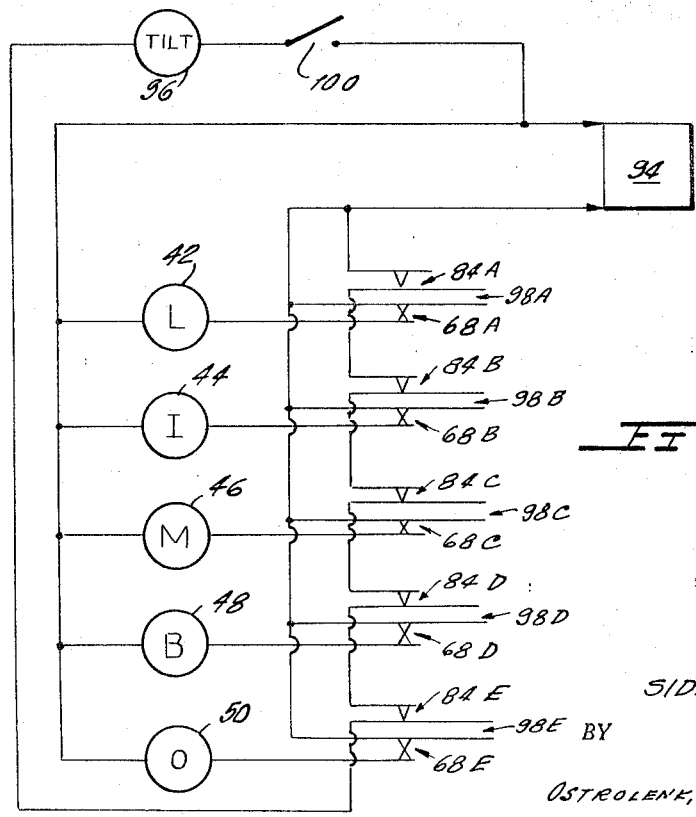

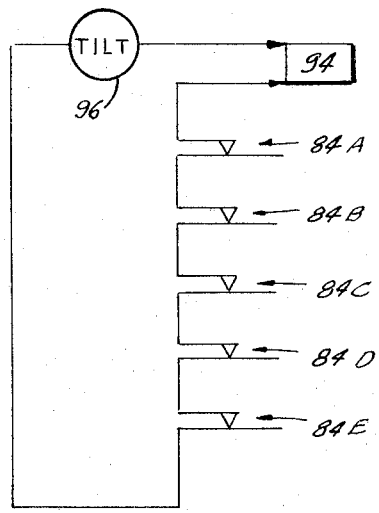
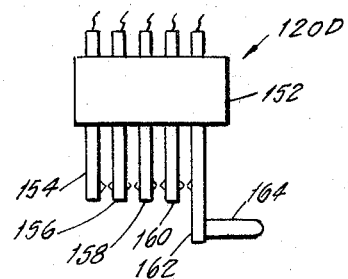
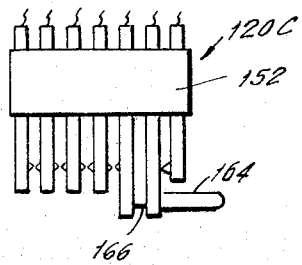
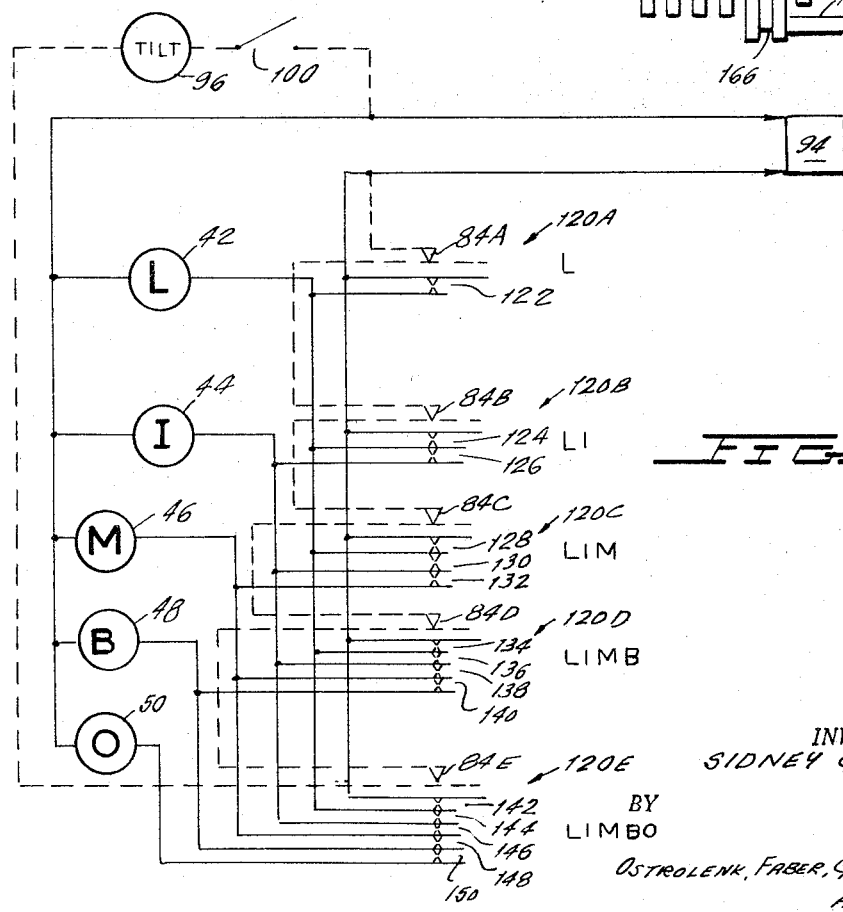

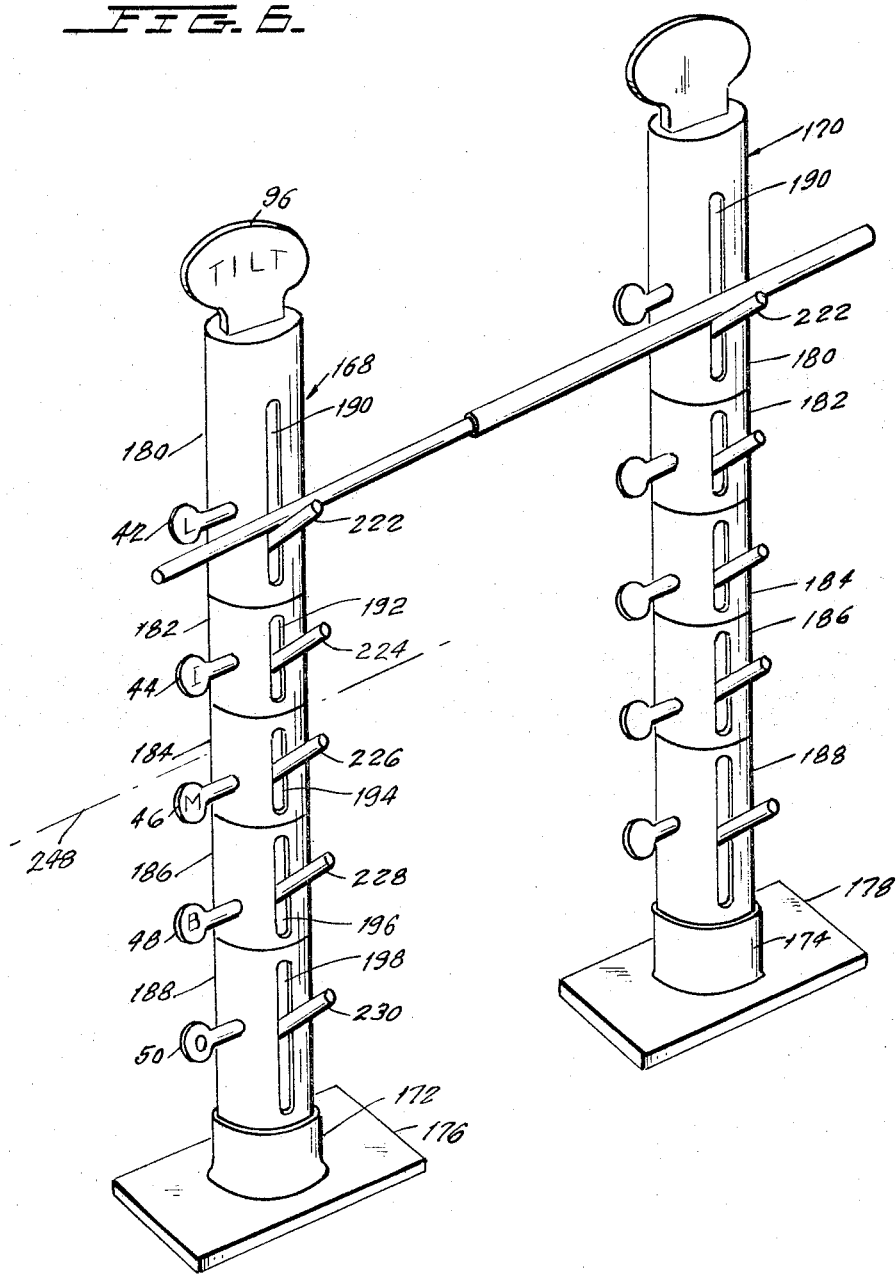

Dec. 27, 1966  S. GOLDSTEIN  3,294,400
DANCING APPARATUS
Filed March 21, 1966  6 Sheets-Sheet 5
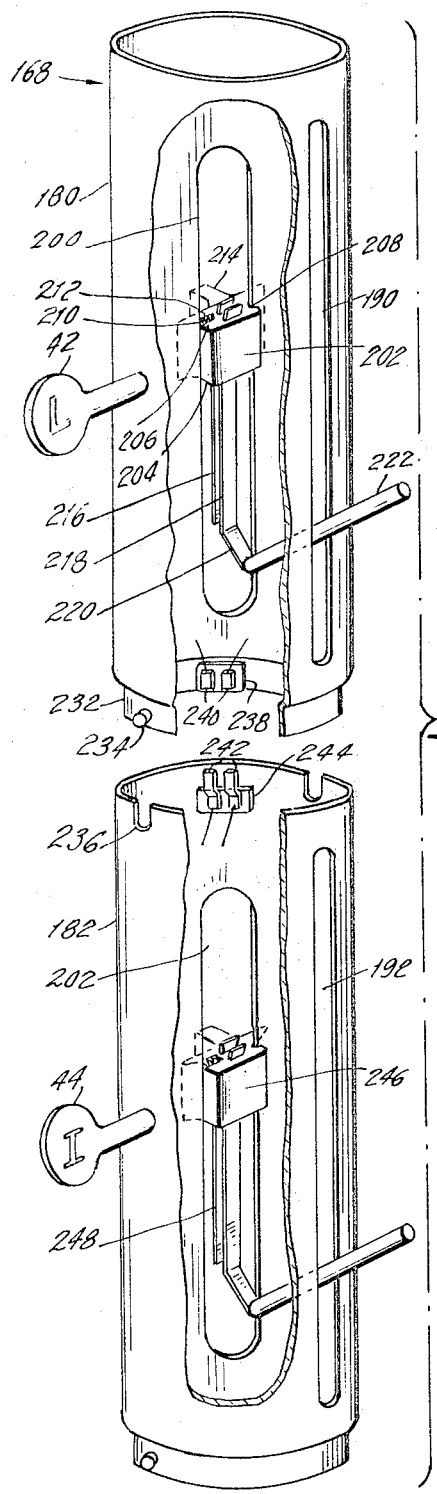
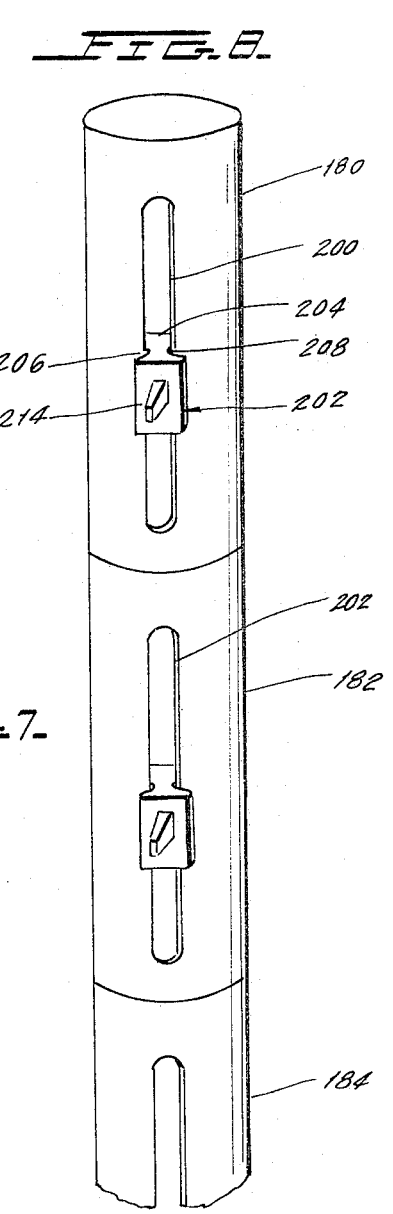
INVENTOR.
SIDNEY GOLDSTEIN
BY
OSTROLENK, FABER, GERB & SOFFEN
ATTORNEYS Dec. 27, 1966 S. GOLDSTEIN 3,294,400
DANCING APPARATUS
Filed March 21, 1966 6 Sheets-Sheet 6
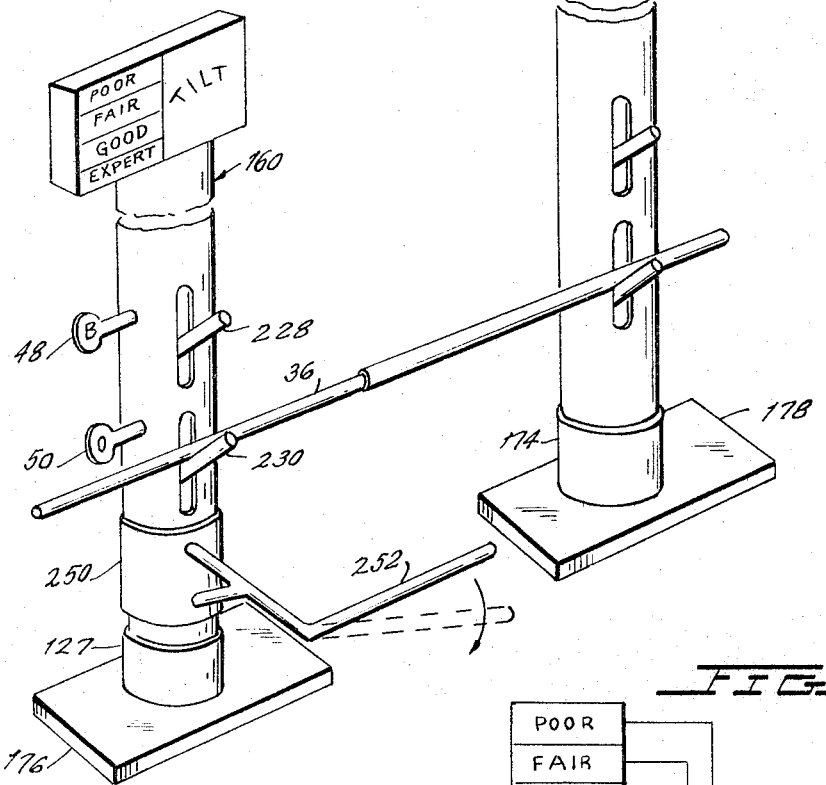
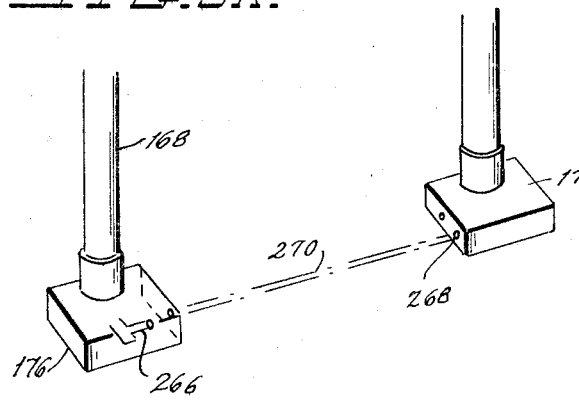
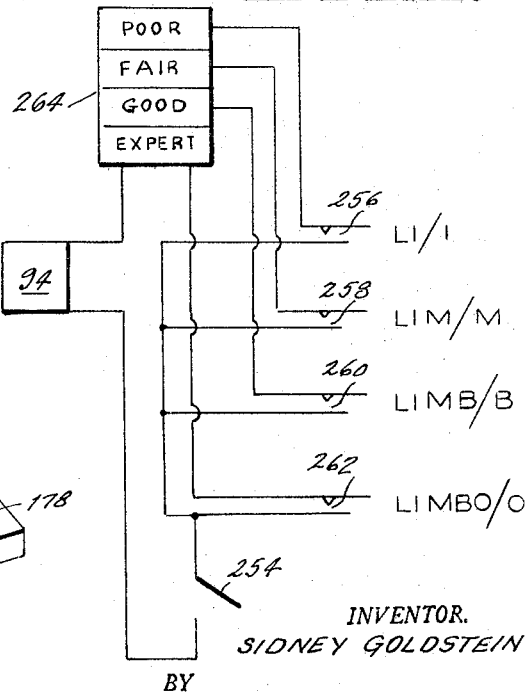
INVENTOR.
SIDNEY GOLDSTEIN
BY
OSTROLENK, FABER, GERB & SOFFEN
ATTORNEYS

United States Patent Office 3,294,400
Patented Dec. 27, 1966

3,294,400
DANCING APPARATUS
Sidney Goldstein, 1406 Paper Mill Road,
Philadelphia, Pa. 19118
Filed Mar. 21, 1966, Ser. No. 535,964
10 Claims. (Cl. 273—1)

This invention relates to dancing apparatus, and more particularly relates to apparatus which may be used in the practice of a calypso type dance most commonly known as the "Limbo."

Generally speaking, the limbo is practiced by a participant approaching a cross-bar which is held or otherwise supported above the ground at a height less than the height of the participant. The dancer is considered successful in any given pass if he can bend backwards sufficiently to pass under the cross-bar without displacing it. In successive passes, the cross-bar is continually lowered such that it is correspondingly more difficult for the dancer to pass thereunder.

In its crudest form, the apparatus used for the dance might comprise a broomstick or equivalent bar or rod held at the given height by two by-standers. More sophisticated apparatus used by professional entertainers might comprise a stand of the type commonly used in the practice of track and field events such as the high jump and pole vault. Thus there may be provided a pair of vertical standards or uprights, each of which would include a vertically adjustable bracket upon which the horizontal cross-bar might be removably supported, thereby eliminating the need for two extra people to practice the dance while at the same time permitting the cross-bar to be discreetly positioned at successively lower heights.

In attempting to utilize the limbo dance as a competitive game, rather than just a pure dancing event, it becomes apparent that both the crude hand-held apparatus and even the more sophisticated jump stand type of apparatus suffer from a common disadvantage. That is, there is no simple, exciting technique for measuring the degree of success or competence which has been achieved by a particular dancer. Particularly with the hand-held crossbar, recognizing the relatively short period of time during which two people could hold a cross-bar in a given position, it becomes apparent that it is virtually impossible to compare the height which may be cleared by two successive dancers, and hence the determination of a winner is, for the most part, pure guess work. Even when using a high-jump type of apparatus, with the exception of the final resting position of the cross-bar, there is no exciting reward, either visual or otherwise, to indicate that the dancer has achieved any degree of expertise in the game. Similarly, unless the various participants physically measure the lowest height which they were able to successfully clear, there is no way in which the winner can be determined.

In contradistinction, the instant invention proposes that the degree of success achieved by a particular dancer can be indicated in a novel way, thus allowing a single participant to interestingly determinne his competence when playing the game alone, or, in the alternative, facilitating the determination of a winner when more than one dancer is participating.

In a preferred embodiment, the instant invention comprises a pair of vertical uprights, at least one of which includes a plurality of energizable indicating means, such as light bulbs, positioned thereon. A horizontal cross-bar is selectively positionable at any one of a plurality of successively lower positions along the uprights, with each of the successively lower positions having one of the light bulbs associated therewith. An electric circuit is provided such that when the cross-bar is placed at any one of the various positions, the light bulb associated with that position will be energized to visually indicate the particular height which the dancer will be attempting to clear. If the cross-bar should be displaced during the attempt, the light bulb corresponding to that position will be de-energized to visually indicate the failure of the dancer to clear that height.

Preferably, the lights are successively lettered "L," "I," "M," "B," "O," such that it becomes the natural object of the game to clear the lowest position and thus keep the "O" light bulb energized. Alternatively, the light bulbs may be located behind cut-out words such as "poor," "fair," "good," "expert," etc. which would more clearly provide a reward for the dancer who clears the lowest height.

In an alternative embodiment, the circuit is arranged such that when the bar is placed at a given position, for example, the position which would energize the "B" light bulb, all the bulbs which are above the "B," that is, "L," "I" and "M" would also be energized. Thus when a dancer successfully cleared the "O" position, all the bulbs would be lit to spell the word "LIMBO" which either alone or in combination with a lit sign spelling "expert," would provide the ultimate reward for successfully completing the game.

As noted above, the instant invention provides that in the event the cross-bar is displaced, either the single light bulb, or the plurality of light bulbs in the second embodiment, would be automatically de-energized, thus in a negative way indicating the failure of the participant to clear the given height. As another feature of the instant invention, an additional circuit may be provided which will in a more positive sense indicate that the bar has been displaced from its pre-set position. Specifically, and as will be further explained, an alarm device such as a light bulb lettered with the word "tilt" will be energized in the event the bar is displaced from any one of the successively lower positions to indicate in a positive sense the failure of the participant to clear that height.

It should now be apparent, and is to be considered an important aspect of the instant invention, that the various embodiments described above may be used alone or in combination with each other. Thus, in its simplest form, the invention would include only the alarm indicator to positively sense that the bar has been displaced from any of the various positions. Alternatively, a single light bulb may be lit when the bar is pre-set at any given position, or the fragmentated parts of the word "Limbo" may be successively lit as the bar is lowered. Similarly, the lighting up of words such as "poor," "fair," "good," "expert," etc. could be used with either of the above embodiments with or without the use of the alarm apparatus to positively indicate that the bar has been displaced from its pre-set position.

As a further feature of the instant invention, the successive positions may be adjustably selected to make it easy or more difficult to energize the associated light bulbs.

As a further feature of the instant invention, the vertical uprights and horizontal cross-bar may be manufactured in small sub-sections to facilitate their shipment to the ultimate user and may thereafter be easily reassembled by virtually any child.

Accordingly, it is an object of the instant invention to provide "Limbo" apparatus which includes a cross-bar selectively posionable at any one of a plurality of positions along a pair of uprights and circuit means responsive to the cross-bar being placed at any one of such positions for energizing indicating means associated therewith.

Yet another object of the instant invention is to provide "Limbo" apparatus which includes circuit means responsive to a cross-bar being placed at any one of a plurality of predetermined positions for energizing indicating means associated with such position and indicating means associated with positions which are above the particular position selected.

Still another object of the instant invention is to provide "Limbo" apparatus which may include circuit means responsive to the cross-bar being displaced from any of the predetermined positions for energizing an alarm signal indicative thereof.

Still another object of the instant invention is to provide such dancing apparatus wherein the plurality of predetermined positions along a pair of uprights may be vertically adjusted in accordance with the skill of the particular dancer.

Yet another object of the instant invention is to provide such "Limbo" apparatus which includes a pair of vertical uprights, each of which comprises a plurality of subsections which may be easily and quickly assembled.

Still another object of the instant invention is to provide such "Limbo" apparatus which includes a basic unit which can be varied by the addition of one or more embellishments to increase the overall sophistication thereof.

Other objects and a fuller understanding of the instant invention may be had by referring to the following description and drawings, in which:

FIGURE 1 is a perspective view of one embodiment of the instant invention;

FIGURES 2a and 2b show the manner in which normally open and normally closed contact pairs, respectively, cooperate with various portions of the apparatus shown in FIGURE 1;

FIGURES 3 and 4 are schematic wiring diagrams of two embodiments of the instant invention;

FIGURE 4a is a schematic wiring diagram for an embodiment of the instant invention which combines concepts shown in FIGURES 3 and 4;

FIGURE 4b shows one of the contact assemblies which might be utilized in the embodiment of FIGURE 4a;

FIGURE 5 is a schematic wiring diagram of an alternative embodiment of the instant invention;

FIGURES 5a and 5b show contact assemblies which might be utilized in the embodiment represented by FIGURE 5;

FIGURE 6 is a perspective view of an alternative embodiment of the instant invention;

FIGURE 7 is an exploded perspective view, partly cut away, showing in detail a portion of the apparatus shown in FIGURE 6;

FIGURE 8 is a rear view of a portion of the apparatus shown in FIGURE 6;

FIGURE 9 is a perspective view of a modified form of the embodiment shown in FIGURE 6;

FIGURE 9a is an alternative embodiment of the apparatus shown in FIGURE 9; and

FIGURE 10 is a schematic circuit diagram which might be utilized in the embodiments of FIGURE 9 or 9a.

Referring to FIGURE 1, there is shown one relatively simple manner in which the "Limbo" apparatus of the instant invention may be practiced. The apparatus 20 includes a pair of generally triangular, vertical uprights 22 and 24, each of which is removably seated in a triangularly shaped receptacle 26 and 28, respectively, provided on base plates 30 and 32. It is to be understood that the uprights 22 and 24 may be formed from virtually any material such as wood, plastic, metal, and although shown as having a triangular cross-section may conveniently be of circular, rectangular or other cross-sectional shape. It should be further understood that although the uprights 22 and 24 have been shown as one-piece members, each could comprise a plurality of smaller subsections which might be easily assembled by the ultimate user.

Each of the uprights 22 and 24 includes a plurality of spaced apart seating notches 34A–34E spaced along their respective lengths. As will be further explained, respective pairs of the seating notches 34A–34E on uprights 22 and 24 cooperate to freely support a horizontal cross-bar 36 with each such respective pair of notches defining successively lower positions relative to the surface upon which the bases 30 and 32 rest.

The cross-bar 36 can be of any convenient material and preferably comprises two cylindrical plastic tubes 38 and 40 dimensioned in such a manner as to permit sliding telescopic movement therebetween.

Associated with each of the successively lower positions defined by the cooperating pairs of spaced apart notches 34A, 34B, 34C, 34D, and 34E, is an energizable indicating means such as the light bulbs 42, 44, 46, 48 and 50, respectively. Although in no way intended to be limited by such disclosure, the light bubls are conveniently lettered to successively spell out the word "Limbo."

Each of the uprights 22 and 24 further includes a cut-out raceway 52 and 54, respectively, which extend along the entire length of the uprights. As will be further explained, such cut-out raceways house the various circuits which may be utilized in the instant invention. Raceways 52 and 54 may also house the batteries (not shown) utilized to energize the various circuits, or in the alternative could house a small step-down transformer (not shown) used to stepdown the voltage of a standard 110 volt outlet to a safe voltage such as 6 volts which may be utilized in the instant invention. Raceways 52 and 54 are normally enclosed by means of removable covers 56 and 58.

As can be most clearly seen in FIGURES 2a and 2b, each of the cut-out seating notches, as illustrated by the seating notch 34A, includes a somewhat rounded seating surface 60 upon which the cross-bar 36 eventually bottoms. Each seating notch is further provided with a passageway 62 which passes from the rear surface 64 of the notch to the raceway 52 provided in the rear of the uprights 22 and 24.

Secured to a forward wall 66 of the raceway 52 by suitable fastening means is a normally open contact pair 68 (see FIGURE 2a). Normally open contact pair 68 includes an insulative member 70 and a pair of contact blades 71 and 72 passing therethrough. Each of the contact blades include contact terminals 74 and 76, respectively, to which the various wires of the circuit being utilized may be secured. Resilient contact blades 71 and 72 are further provided with internally disposed contact points 78 and 80, respectively, which are urged into engagement in response to lateral movement of a contact arm 82 within the passageway 62 caused by the seating of horizontal cross-bar 36 on the lower seating surface 60 of the notch 34A. It should be apparent that when cross-bar 36 is displaced from the seating surface 60, the natural resilience of contact blade 72 returns the contact arm 82 to the solid line position shown in FIGURE 2a such that the contact points 78 and 80 are once again separated to their normally open position.

FIGURE 2b is similar to FIGURE 2a but shows a normally closed contact pair 84 positioned such that the normally closed contact points 86 and 88 will be opened in response to the deflection of resilient contact blade 90 caused by lateral movement of the contact arm 92 in passageway 62 in response to the seating of cross-bar 36 on lower seating surface 60.

It is to be understood that FIGURES 2a and 2b are merely illustrative of the various techniques which might be utilized to close or open the contact pairs of normally open or normally closed contact pairs, respectively, in response to the seating or displacement of the horizontal cross-bar 36 in the pairs of cooperating seating notches 34A–34E, and that numerous other arrangements are within the contemplation of the instant invention for providing the same results. Furthermore, although the invention will be described with respect to various circuits being utilized in only one upstanding upright such as 22, it is to be understood that the various circuits described could be utilized in both uprights 22 and 24, if so desired.

Referring to FIGURE 3, there is shown a schematic circuit diagram of one embodiment of the apparatus shown in FIGURE 1. Located at each of the seating notches 34A, 34B, 34C, 34D, and 34E of the upright 22, and operatively positioned with respect to such notches in the manner illustrated in FIGURE 2a, are the normally open contact pairs 68A–68E. Taking contact pair 68B as exemplary, it will be seen that one contact blade 72B is electrically connected to an energy source 94 which, as noted above, may be either a D.C. battery or the step-down transformer used in conjunction with a standard 110 volt 60 cycle outlet. The second contact blade 70B is electrically connected through the indicating light bulb 44 to the other side of the energy source 94.

It becomes apparent that if the cross-bar 36 is placed in the seating notches 34B in FIGURE 1, resilient contact blade 72B would be deflected to complete the circuit path including energy source 94, contact pair 68B and lamp 44, thus visually indicating the particular height at which the cross bar 36 is resting. If the dancer should displace the bar 36 from the seating notches 34B, the resiliency of contact blade 72B will return the contact pair 68B to its normally open condition and the light bulb 44 will be deenergized to visually indicate the failure of the participant to successfully pass under the cross-bar without displacing it.

Similarly, if the cross-bar 36 is placed in any of the positions 34A–34E the light bulb 42–50 associated with that position will be energized (because of the closing of the normally open contact pair associated therewith) to visually indicate the particular height which is being attempted. If the bar should be displaced from any of these positions the light associated therewith will become de-energized. Obviously, it would be the natural object of the game to successively light the bulbs from "L" through "O" such that the winner in a competitive game would be the dancer who could keep the "O" lit while passing under the cross-bar 36.

FIGURE 4 shows the circuit diagram of an embodiment of the instant invention which might be used alone or in combination with the circuit diagram shown in FIGURE 3. In such embodiment there is provided an alarm indicating means such as the "tilt" light bulb 96 in a series circuit with the five normally closed contact pairs 84A–84E and the energy source 94. Each of the normally closed contact pairs may be provided at the respective seating notches 34A–34E in FIGURE 1, in the manner shown and described with respect to FIGURE 2b, and would occupy their normally closed condition whenever the bar 36 was not seated within the respective seating notches.

Assuming the cross-bar 36 seated in seating notches 34A, the normally closed contact pair 84A would be opened to de-energize the light bulb 96. If the bar should be displaced and knocked off the seating notch 34A by the dancer, contact pair 84A would revert to its normally closed condition to energize the alarm signal which in this case is in the light bulb lettered with the word "tilt" thus positively indicating the failure of the participant to complete the particular pass.

FIGURE 4a is an embodiment illustrating the circuit of FIGURE 3 combined with the circuit of FIGURE 4 in which each of the contact assemblies 98A–98E includes a normally closed and normally open contact pair 84A–84E and 68A–68E, respectively. Taking contact assembly 98C as exemplary, it becomes apparent that if the cross-bar 36 is seated in the cooperating seating notches 34C of FIGURE 1, the normally closed contact pair 84C will be opened to de-energize the "tilt" light 96, while the normally open contact pair 68C will be closed to energize the "M" light bulb 46 thereby visually indicating the height at which the cross-bar 36 is resting. If the dancer should knock or displace the cross-bar 36 from the seating notches 34C, contact pair 84C will revert to its normally closed position to energize the "tilt" light 96, while the contact pair 68C will revert to its normally open condition to de-energize the light bulb 46 thereby combinedly indicating the failure of the dancer to successfully clear the height presented by the light bulb "M." A switch 100 may be provided in series with the light bulb 96 to allow the user the choice of using or not using the "tilt" circuit.

FIGURE 4b is a detailed view of any one of the contact assemblies 98A–98E, each of which may include the insulative member 102, the four spaced apart contact blades 104, 106, 108 and 110. Blades 104 and 106 constitute the normally closed contact pair electrically joined by the contact point 112, while contact blades 108 and 110 (joined by contact points 114) constitute the normally open contact pair. An insulative wafer 116 is provided to insulate the normally closed contact pair from the normally open contact pair. Contact arm 118 is provided to produce the opening and closing of the respective contact pairs in response to the cross-bar being located at the particular position involved.

FIGURE 5 shows the wiring diagram of an alternative embodiment of the instant invention which in response to the cross-bar 36 being positioned in any one of the pairs of spaced apart notches of FIGURE 1, the indicating light bulb associated with that position as well as all light bulbs above will be energized. Specifically, there is provided a plurality of contact assemblies 120A–120E, with the uppermost contact assembly 120A (being shown in solid line) including one normally open contact pair 122, while each of the successively lower contact assemblies 120B–120E includes an increasing number of normally open contact pairs identified as 124 and 126 for contact assembly 120B; 128, 130 and 132 for contact assembly 120C; 134, 136, 138 and 140 for contact assembly 120D; and 142, 144, 146, 148 and 150 for contact assembly 120E.

Taking contact assembly 120D as exemplary, it will be appreciated that if the cross-bar 36 should be positioned in the seating notches 34D of FIGURE 1, to thereby close each of the contact pairs 134, 136, 138 and 140 in the manner suggested in FIGURE 2a, the light bulb 48 associated with that position, as well as the light bulbs 46, 44 and 42 located above such position will all be connected in parallel paths with the energy source 94 such that the partial word "LIMB" will be visually expressed. Similarly, if the bar 36 were placed in the seating notches 34E of FIGURE 1 to close the normally open contact pairs 142, 144, 146, 148, 150 all five light bulbs 42, 44, 46, 48 and 50 would be energized to spell out the word "Limbo".

It becomes apparent that it would be an object of the game to successively light the partial words beginning with the letter "L" through "LI," "LIM," "LIMB" until the entire word "LIMBO" was lit up to successively indicate the degree of competence being obtained by the dancer.

FIGURE 5a shows in detail an exemplary contact assembly such as 120D including the insulative member 152 and the spaced apart contact blades 154, 156, 158, 160 and 162 upon which is secured the contact arm 164. Contact arm 118 would be received in the respective passageway such as 62 shown in FIGURE 2a.

FIGURE 5 also shows in dotted lines the manner in which a circuit such as that shown in FIGURE 4 may be added to provide a more positive indication that the bar has been displaced by the dancer. Such embodiment is provided with a series circuit including the "tilt" light 96 and the normally closed contact pairs 84A–84E which are operatively added to the contact assemblies 120A–120E such that the light 96 would be energized any time the cross-bar 36 was displaced from one of the positions in the manner suggested by FIGURE 4.

FIGURE 5b shows the contact assembly 120D of FIGURE 5a, but including a normally closed contact pair such as 84D spaced from the remainder of the contact assembly by the insulative wafer 166.

FIGURE 6 shows an alternative embodiment of the instant invention in which generally cylindrical uprights 168 and 170 are supported within cylindrically shaped receptacles 172 and 174 provided on base members 176 and 178. As will be further explained, the embodiment of FIGURE 6 differs from the embodiment of FIGURE 1 in two main respects; first, each of the uprights comprises a plurality of sub-sections 180, 182, 184, 186 and 188 which may be easily assembled to form the overall uprights 168 and 170, and secondly, each of the height defining positions corresponding to the notches 34A–34E in FIGURE 1 may be adjustably selected within a range determined by the length of elongated slots 190, 192, 194, 196 and 198 provided within each of the sections 180, 182, 184, 186 and 188, respectively.

Turning now to FIGURE 7 which shows a perspective partially cut away exploded view of sections 180 and 182 of the upright 168, it may be seen that in addition to a narrow elongated slot, such as 190, there is provided in a rear surface of the sub-section a relatively wider elongated slot 200 within which contact assembly 202 may be vertically adjusted. Contact assembly 202 includes an insulative member 204, the opposite edges of which include generally U-shaped grooves 206 and 208 by means of which the contact assembly 202 is trapped within the elongated slot 200. A compression spring 210 is provided within a slot 212 to continually engage the edge of slot 200 to prevent the contact assembly 202 from slipping from its pre-set position. A rearwardly projecting handle 214 extends out the rear of slot 200 by means of which contact assembly 202 may be vertically moved to any position defined by the length of slot 200 (see FIGURE 8).

For the first normally open contact pair 68a of FIGURE 3, or 122 of FIGURE 5, contact assembly 202 would include a normally open contact pair comprising blades 216 and 218, with blade 218 including a bent portion 220. Secured to the bent portion 220 of contact blade 218 is a contact arm 222 which extends through narrow slot 190 of section 180 and is vertically movable within the slot 190 in response to the movement of contact assembly 202 effected by vertically moving the handle 214. As indicated in FIGURE 6, contact arms 222 (and 224, 226, 228, 230) may support cross-bar 36.

Without repeating the details of FIGURES 3 and 5, it will be appreciated that either of the circuits shown in those figures may be incorporated into the embodiment of FIGURE 6, such that in response to a cross-bar being placed on the contact arms 222, 224, 226, 228 or 230 of FIGURE 6, either the one light bulb associated with the particular contact arm, or the particular light bulb associated with that position as well as all those above may be energized. Similarly it is to be appreciated that the circuit arrangement of FIGURE 4 could be added to either embodiment as suggested by FIGURE 4a and the dotted portion of FIGURE 5. Also, if desired, the concept of being able to vary the height of the cross-bar resting positions could be practiced in an embodiment in which the uprights 168 and 170 were of one-piece construction rather than sub-sections.

Section 180 terminates in a somewhat smaller neck portion 232 provided with a pair of diametrically opposed upstanding buttons 234 (only one of which may be seen in FIGURE 7) which cooperate with elongated slots 236 provided in the upper portion of sub-assembly 182 to securely lock such subassemblies together. On the interior surface of lower neck portion 232 is provided an insulative block 238 upon which are seated contact pads 240. When sections 180 and 182 are telescoped together, contact pads 240 lie beneath and frictionally engage contacts 242 provided on an insulative pad 244 secured to the interior of sub-section 182 to establish the necessary electrical continuity between the two sub-assemblies. Similarly sub-sections 182 and 184; 184 and 186; and 186 and 188 are provided with cooperating sliding contact pairs such as 240, 242 to insure the necessary electrical continuity between the various sub-assemblies. It will be appreciated that the number of contact pairs necessary for each joint will be dependent upon the circuit being utilized; that is, only two contact pairs 240, 242 are necessary for each sub-section if the circuit of FIGURE 3 were being utilized, and an increasing number of contact pairs 240, 242 would be necessary if the circuit of FIGURE 5 were being utilized. Note that in FIGURE 3 only two wires join each successive contact pair 68A–68E, while in FIGURE 5 an increasing number of wires join successive contact assemblies 120A–120E.

Sub-assembly 182, and for that matter sub-assemblies 184, 186 and 188, is identical to sub-assembly 180, with the exception that where the circuit of FIGURE 5 is being mechanized, the lower contact assembly 246 includes one more contact blade 248. Similarly, the successively lower contact assemblies of sub-sections 184, 186 and 188 (not shown) would include an ever increasing number of contact blades. If the circuit of FIGURE 3 were being mechanized, however, all the contact assemblies of sections 182, 184, 186 and 188 would be identical to the contact assembly 202.

It should be apparent that rather than having five or more sub-assemblies, such as 180–188, the principles of the instant invention may be practiced by having only two or three sub-sections, such as by splitting the upright 168 at 248 between the "I" and "M." In such an embodiment only one set of sliding contacts such as 240, 242 of FIGURE 7 need be employed to provide the necessary electrical continuity. (See also FIGURE 5 where the line 248 cuts the electrical circuit such that only one set of four sliding contact pairs 240, 242 would be required.)

It may also be appreciated that the principles of cooperating sub-assemblies which have been explained with respect to FIGURE 7 could also be applied to the embodiment of FIGURE 1 wherein the various height-determining positions are fixed, rather than adjustable, by the seating notches 34A–34E.

Turning now to FIGURE 9 and FIGURE 10, there is shown an embodiment in which there is provided means for positively sensing the successful completion of any particular pass by the dancer. Freely rotatable on upright 168 is provided a sleeve 250 to which is secured a generally L-shaped feeler arm 252. The sleeve and feeler arm are moved from the solid line position shown in FIGURE 9 to the dotted position shown in FIGURE 9 by the legs of the dancer as he passes under the bar 36 positioned on any of the contact arms 222–230. After the dancer passes, the sleeve 250 and feeler arm 252 are returned to their original position by a return spring (not shown).

The sleeve 250 is provided with a normally open switch 254 (see FIGURE 10) which is closed when feeler arm 252 has experienced a predetermined amount of rotation which may be initially determined by means of a simple limit switch (not shown).

Switch 254 is in series with each of a plurality of parallel, normally open contact pairs 256, 258, 260 and 262 which may be added to either the contact pairs 68B–68E of FIGURE 3 or the contact assemblies 120B–120E of FIGURE 5 (hence the identification L1/I in FIGURE 10 signifying that either one bulb or a part of the word "Limbo" may be lit.)

Assuming the cross-bar 36 positioned on the contact arms 230, as shown in FIGURE 9, such that normally open contact pair 262 will close, then depending on whether the circuit of FIGURE 3 or FIGURE 5 is being utilized, either the "O" or the word "LIMBO," will be lit up. If the dancer gets far enough passed the crossbar 36 without displacing it, then feeler arm 252 will experience the necessary degree of rotation; normally open switch 254 will close; and the circuit path including switch 254, contact pair 262, the source 94, and the light bulb 264 spelling out the word "expert" will be complete to visually indicate expertise in the game. If on the other hand, the bar 36 is displaced, at any time, contact pair 262 will open and, not only will the expert sign fail to light, but as explained with respect to FIGURES 3 and 5, the one light 50, or all lights 42–50 (if FIGURE 5 circuit is being used) will all be de-energized. It will be appreciated that the alarm circuit of FIGURE 4 could be added to more positively indicate failure at any particular height.

FIGURE 9a is similar to FIGURE 9, but provides that a light source 266 be positioned in base member 176 and a photo detector 268 be positioned in the side of base member 178. When the dancer's legs break the beam of light 270, the switch 254 of FIGURE 10 is closed to initiate the operations discussed above. Since electric eye type devices are well known and well understood by those skilled in the art, a detailed analysis of the circuits for such a device is thought unnecessary.

Thus there has been described a relatively simple "limbo" apparatus which can be constructed in accordance with various embodiments to increase the sophistication of the results which can be expected.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Dancing apparatus comprising:
   first and second uprights, one of said uprights having a plurality of energizable indicating means positioned thereon;
   a cross-bar selectively positionable at any one of a plurality of positions along said uprights, each of said positions having one of said plurality of energizable indicating means associated therewith; and
   circuit means responsive to said cross-bar being placed at any one of said positions for energizing the energizable indicating means associated therewith.

2. The dancing apparatus of claim 1, wherein said circuit means comprises:
   an energy source;
   a plurality of normally open contact pairs, one of said plurality of contact pairs being associated with each of said plurality of positions, each of said contact pairs being changed from its normally open to a closed circuit condition in response to said cross-bar being placed at the position associated therewith; and
   a plurality of circuit paths, each of said circuit paths including said energy source, one of said indicating means, and one of said normally open contact pairs;
   whereby, when said cross-bar is placed at one of said positions and thereby changes the contact pair associated therewith from its normally open to its closed circuit condition, the circuit path including that contact pair will be completed and the indicating means in the completed circuit path will be energized.

3. The dancing apparatus of claim 1, wherein said first and second uprights are each comprised of an assembly of sub-sections each of which includes means for removably securing adjacent sub-sections thereto.

4. The dancing apparatus of claim 3, wherein adjacent sub-sections of said one of said uprights includes cooperating contact means for establishing continuity of said circuit means when said sub-sections of said one of said uprights are secured to one another.

5. The dancing apparatus of claim 1, wherein each of said plurality of positions may be preselectively varied along said uprights.

6. Dancing apparatus comprising:
   first and second uprights, one of said uprights having a plurality of energizable indicating means positioned thereon;
   a cross-bar selectively positionable at any one of a plurality of successively lower positions along said uprights, each of said positions having one of said plurality of energizable indicating means associated therewith; and
   circuit means responsive to said cross-bar being placed at any one of said positions for energizing the indicating means associated with said any one of said positions and the indicating means associated with positions which are above said any one of said positions.

7. The dancing apparatus of claim 6, wherein said first and second uprights are each comprised of an assembly of sub-sections each of which includes means for removably securing adjacent sub-sections thereto.

8. The dancing apparatus of claim 7, wherein adjacent sub-sections of said one of said uprights includes cooperating contact means for establishing continuity of said circuit means when said sub-sections of said one of said uprights are secured to one another.

9. The dancing apparatus of claim 6, wherein said circuit means comprises:
   an energy source;
   a plurality of contact assemblies, one of said contact assemblies associated with each of said positions and each including at least one normally open contact pair, the contact assemblies associated with successively lower positions including a successively larger number of contact pairs, the contact pairs of any one contact assembly being changed from their normally open to a closed circuit condition in response to said cross-bar being placed at the position associated therewith; and
   a circuit arrangement associated with each one of said contact assemblies, each of said circuit arrangements including said energy source, the normally open contact pairs included in said one of said contact assemblies and a network of parallel paths which include the indicating means associated with said one of said contact assemblies and the indicating means associated with contact assemblies which are above said one of said contact assemblies;
   whereby, when said cross-bar is placed at one of said positions and thereby changes the contact pairs of the contact assembly associated therewith from their normally open to their closed circuit condition, the indicating means associated with said one of said positions and the indicating means associated with all of said positions above said one of said positions will be energized.

10. The dancing apparatus of claim 6, wherein said circuit means includes:
    an energy source;
    a first contact assembly associated with a first one of said positions, said first contact assembly including at least one normally open contact pair changeable to a closed circuit condition in response to said cross-bar being placed at said one of said positions;
    a second contact assembly associated with a second one of said positions which is lower than said first one of said positions, said second contact assembly including at least one more normally open contact pair than said first contact assembly, all of said normally open contact pairs of said second contact assembly being actuated to closed circuit conditions in response to said cross-bar being placed at said second position;
    a first circuit arrangement associated with said first contact assembly, said first circuit arrangement including said energy source, the normally open contact pairs of said first contact assembly, and an electrical path which includes the indicating means associated with said first one of said positions; and a second circuit arrangement associated with said second contact assembly, said second circuit arrangement including said energy source, the normally open contact pairs of said second contact assembly, and a plurality of parallel electrical paths which include the indicating means associated with said first one of said positions and the indicating means associated with said second one of said positions;

whereby, when said cross-bar is placed at said first one of said positions to change the normally open contact pairs of said first contact assembly to their closed circuit condition, the indicating means associated with said first position will be energized; and when said cross-bar is placed at said second one of said positions to change the normally open contact pairs of said second contact assembly to their closed circuit condition, the indicating means associated with said first and second ones of said positions will be energized.

References Cited by the Examiner
UNITED STATES PATENTS

| | | | |
|---|---|---|---|
| 662,810 | 11/1900 | Peak | 272—59 |
| 1,902,995 | 3/1933 | Flynn | 272—59 |
| 2,279,539 | 4/1942 | Vogt et al. | 272—59 |
| 2,299,798 | 10/1942 | Colson et al. | 272—62 X |
| 3,208,747 | 9/1965 | Kavakos | 273—1 |

FOREIGN PATENTS 221,592   5/1910   Germany.

References Cited by the Applicant
UNITED STATES PATENTS 3,107,091   10/1963   Jenkins.
3,209,729   10/1965   Zedaker.

RICHARD C. PINKHAM, *Primary Examiner.*

A. W. KRAMER, *Assistant Examiner.*